T. B. NICKEL.
PUMP OPERATING MECHANISM.
APPLICATION FILED JAN. 24, 1919.

1,391,572. Patented Sept. 20, 1921.

Witness

Inventor
T. B. Nickel,
By C. A. Snow & Co.
Attorneys

UNITED STATES PATENT OFFICE.

THOMAS B. NICKEL, OF McCRACKEN, KANSAS.

PUMP-OPERATING MECHANISM.

1,391,572.  Specification of Letters Patent.  Patented Sept. 20, 1921.

Application filed January 24, 1919. Serial No. 272,878.

*To all whom it may concern:*

Be it known that I, THOMAS B. NICKEL, a citizen of the United States, residing at McCracken, in the county of Rush and State of Kansas, have invented a new and useful Pump-Operating Mechanism, of which the following is a specification.

This invention relates to pump operating mechanism, especially for use in filling the tires of automobiles, one of the objects of the invention being to provide mechanism mounted on the vehicle structure and adapted to be readily connected to and disconnected from the engine so that air under pressure can be provided for inflating one or more of the tires.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

Figure 1:
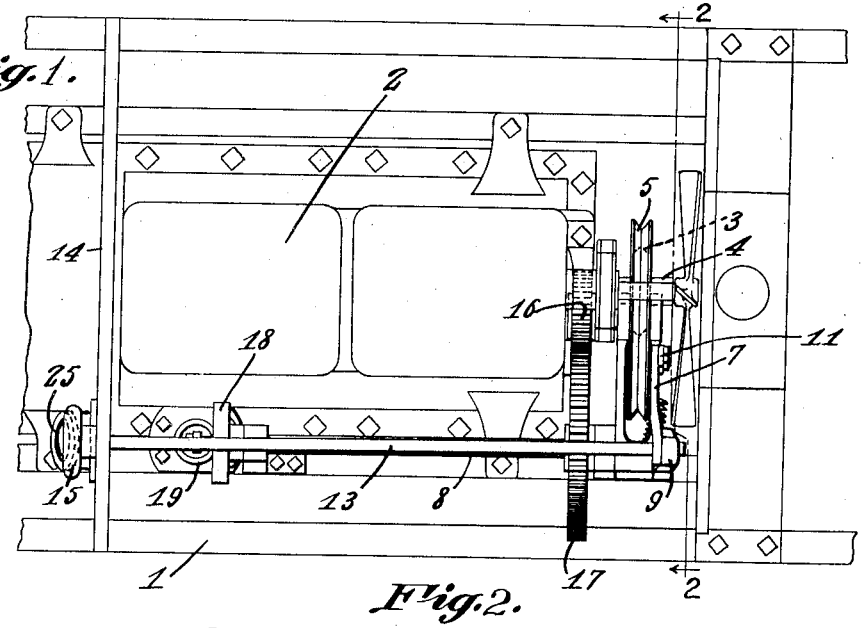
Figure 1 is a plan view of the motor and pump and the mechanism for operating the pump.
Figure 2:
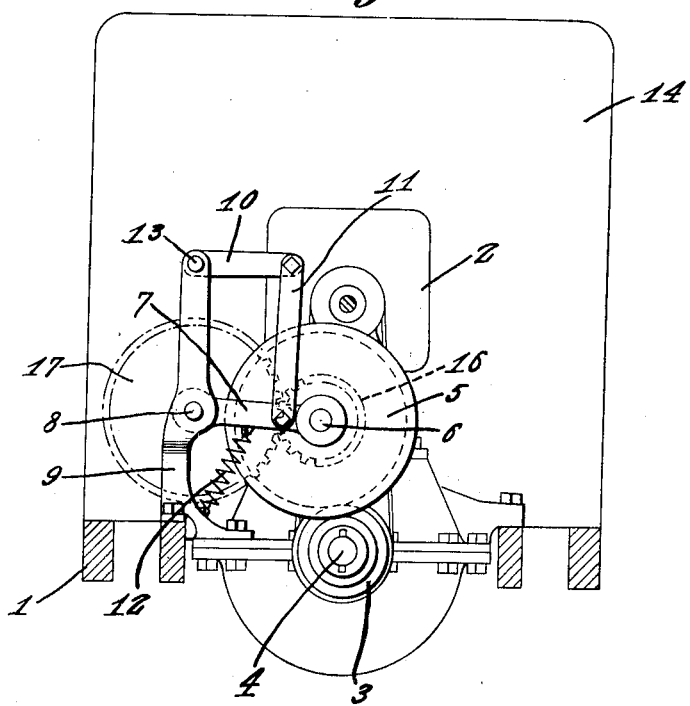
Fig. 2 is a section on line 2—2 Fig. 1.

Referring to the figures by characters of reference 1 designates the automobile structure provided with an engine 2. A friction wheel 3 is secured to the shaft 4 of the engine and is adapted to engage a larger friction wheel 5 secured to a short shaft 6. This shaft is journaled in an arm 7 pivotally mounted on a shaft 8 which is mounted in a standard 9. An arm 10 is mounted to swing on the standard 9 and is connected to the arm 7 by a link 11. A spring 12 connects the arm 7 to the base portion of the standard 9.

Secured to the arm 10 and journaled within the standard 9 is a rod 13 which extends rearwardly through the dash 14 and is provided with a handle 15 thereby the rod can be rotated readily so as to cause the arm 10 to swing upwardly thereby to lift the wheel 5 out of engagement with the wheel 3.

Secured to the shaft 6 is a gear 16 constantly in mesh with a larger gear 17 journaled on the shaft 8 which constitutes the pivot of the arm 7. The rear end of shaft 8 is provided with a crank disk 18 adapted to operate a pump 19. A pressure gage 25 can be connected to a pipe leading from the pump 19.

When the pressure falls below a certain point the operator can, by turning the handle 15, allow the wheel 5 to move against the wheel 3 and be actuated thereby while the engine is in operation. Thus motion will be transmitted through gears 16 and 17 to the shaft 8 and the pump will be operated to compress air.

What is claimed is:

The combination with a motor vehicle including an engine shaft and a friction drive wheel revoluble with said shaft, of a standard, a driven shaft journaled in the standard, a gear secured to said driven shaft, an arm mounted to swing upon the driven shaft, a controlling rod mounted for rotation in the standard and extending through the dash of the vehicle, means for rotating said rod, an arm movable with the rod, a link connection between the arms, a friction wheel carried by one of the arms, yielding means for holding the friction wheel normally in contact with the drive wheel, and a gear revoluble with said friction wheel and constantly in mesh with the gear upon the driven shaft.

In testimony that I claim the foregoing as my own, I have hereto affixed my signature in the presence of two witnesses.

THOMAS B. NICKEL.

Witnesses:
F. E. RHODES,
W. H. WOODS.